(12) United States Patent
Mastro et al.

(10) Patent No.: US 7,178,780 B2
(45) Date of Patent: Feb. 20, 2007

(54) COMPOSITE COATING FOR MOLD INSERT AND METHOD FOR MAKING A COATED MOLD INSERT

(75) Inventors: Paul F. Mastro, Pittsford, NY (US); Christopher D. Blair, Ontario, NY (US); Jennifer R. Wagner, Walworth, NY (US); Jay Schneider, Canandaigua, NY (US)

(73) Assignee: Xerox Corporation, Stamford, CT (US)

( * ) Notice: Subject to any disclaimer, the term of this patent is extended or adjusted under 35 U.S.C. 154(b) by 17 days.

(21) Appl. No.: 10/815,073

(22) Filed: Mar. 31, 2004

(65) Prior Publication Data

US 2004/0178321 A1    Sep. 16, 2004

Related U.S. Application Data

(62) Division of application No. 09/794,131, filed on Feb. 28, 2001, now Pat. No. 6,749,787.

(51) Int. Cl.
*B29C 33/38* (2006.01)
(52) U.S. Cl. .................. 249/116; 249/135; 425/190
(58) Field of Classification Search ............ 249/114.1, 249/116, 135, 160; 425/190, 193
See application file for complete search history.

(56) References Cited

U.S. PATENT DOCUMENTS

| 4,747,864 | A |   | 5/1988  | Hagerty et al. ............... 65/66 |
|-----------|---|---|---------|-------------------------------------|
| 5,489,410 | A |   | 2/1996  | Baumgartner et al. ...... 264/219   |
| 5,575,961 | A |   | 11/1996 | Kuwabara et al. ......... 264/1.33  |
| 5,861,114 | A | * | 1/1999  | Roffman et al. ............ 264/2.5  |
| 5,945,059 | A | * | 8/1999  | Atake ........................ 264/510 |
| 5,958,469 | A |   | 9/1999  | Richards .................... 425/175 |
| 6,207,284 | B1|   | 3/2001  | Varanasi et al. ............ 428/426 |
| 6,258,311 | B1|   | 7/2001  | Jens et al. .................. 264/220 |
| 6,409,813 | B1|   | 6/2002  | Beesabathina et al.                 |

FOREIGN PATENT DOCUMENTS

JP         11-105039       *  4/1999

OTHER PUBLICATIONS

English abstract and computer translation of JP 11-105039.*

* cited by examiner

*Primary Examiner*—Donald Heckenberg
(74) *Attorney, Agent, or Firm*—Oliff and Berridge, PLC

(57) ABSTRACT

A mold used to form a magnetic member includes a mold body having a mold opening, a mold support that supports the mold cavity, and a mold insert. The mold insert is disposed in the mold opening of the mold body to form a mold cavity. The mold insert is coated with a coating to protect the mold body from chemical attack and abrasive wear of the mold material. The coating comprises an electroless nickel layer formed on or over the mold insert, and a chromium nitride layer formed on or over the electroless nickel layer. The mold insert can be formed of beryllium-copper (Be—Cu).

18 Claims, 5 Drawing Sheets

COMPOSITE COATING FOR MOLD INSERT AND METHOD FOR MAKING A COATED MOLD INSERT

CROSS REFERENCE TO RELATED APPLICATIONS

This is a divisional of U.S. application Ser. No. 09/794,131, filed Feb. 28, 2001, now U.S. Pat. No. 6,749,787, issued Jun. 15, 2004 by the same inventors, and claims priority therefrom. This divisional is being filed in response to a restriction requirement in that prior application.

BACKGROUND OF THE INVENTION

This invention relates to molds that contain a mold insert.

Magnetic rolls can be made by injection molding a plastic resin highly filled with ferrite particles into a cylindrical mold. The mold includes a body having a cylindrical opening that extends through the body. The mold typically also includes a mold insert to accommodate the abrasive wear caused by the material used to make the magnetic roller. The mold insert is positioned at least partially against the surface of the cylindrical opening in the body. The inner surface of the mold insert is adapted to conform to at least a portion of the periphery of the magnetic roll. The mold inserts are replaceable so that a worn insert may be replaced with a new insert.

SUMMARY OF THE INVENTION

The ferrite-filled plastic material used to make magnetic members is both abrasive and corrosive. Thus, a mold insert is required to be durable and exhibit the required thermal and magnetic characteristics. Mold inserts are typically made of any suitable durable material. Preferably, mold inserts are made of a non-magnetic metal, for example beryllium-copper (Be—Cu).

Mold inserts are prone to chemical attack and abrasive wear. Thus, mold inserts need to be replaced frequently. In a typical injection molding apparatus, a Be—Cu mold insert needs to be replaced after forming about 25,000 magnetic members. A Be—Cu mold insert costs nearly $10,000. The frequency of replacement of mold inserts, combined with the high cost of mold inserts, increases the overall cost of producing magnetic members using an injection molding process.

Attempts have been made to coat mold inserts with a hard coating to prevent wearing of the mold inserts. Several hard coatings have been tried, but have not successfully prevented wearing of the mold inserts for several reasons. Ferrite particles in the mold material mechanically attack and wear away many coatings quickly and easily. After the coating is mechanically removed, the mold insert is susceptible to chemical and mechanical attack.

This invention provides mold insert coating structures that protect mold inserts from chemical attack and abrasive wear of mold materials, and methods for coating mold inserts with the coating.

This invention separately provides mold insert coating structures that protect mold inserts form chemical attack and abrasive wear over a long period of time, and methods for coating mold inserts with the coating.

This invention separately provides mold insert coating structures that reduce the expense of injection molding magnetic members by reducing the number of times mold inserts need to be replaced, and methods for coating mold inserts with the coating.

In various exemplary embodiments of the coating structures and methods according to this invention, a removeable mold insert is provided in a mold. The mold insert includes a Be—Cu mold insert. An electroless nickel layer is formed on or over the Be—Cu mold insert. A layer of chromium nitride is formed on or over the electroless nickel layer. The electroless nickel layer and the chromium nitride layer reduce the effects of corrosive wear and chemical attack on the mold material and the Be—Cu mold insert.

These and other features and advantages of the invention are described in, or are apparent from, the following detailed description of various exemplary embodiments of the methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Various embodiments of the methods and systems according to this invention can be used to make a magnetic roller used in any known or later-developed electrophotographic image forming apparatus, such as a facsimile apparatus, a laser printer, or a copier. It should be appreciated that the various embodiments of the methods and systems according to this invention can be used to make a magnetic member usable for any purpose. These uses include, but are not limited to, as a developing roller included in a developing device, or as a cleaning roller included in a cleaning device, or similar cylindrical structural body. Thus, while the following discussion may focus primarily on cylindrical magnetic members, or rolls or rollers, the systems and methods of this invention can be used in injection molds and molding methods for forming magnetic members of any desired shape.

Figure 1:
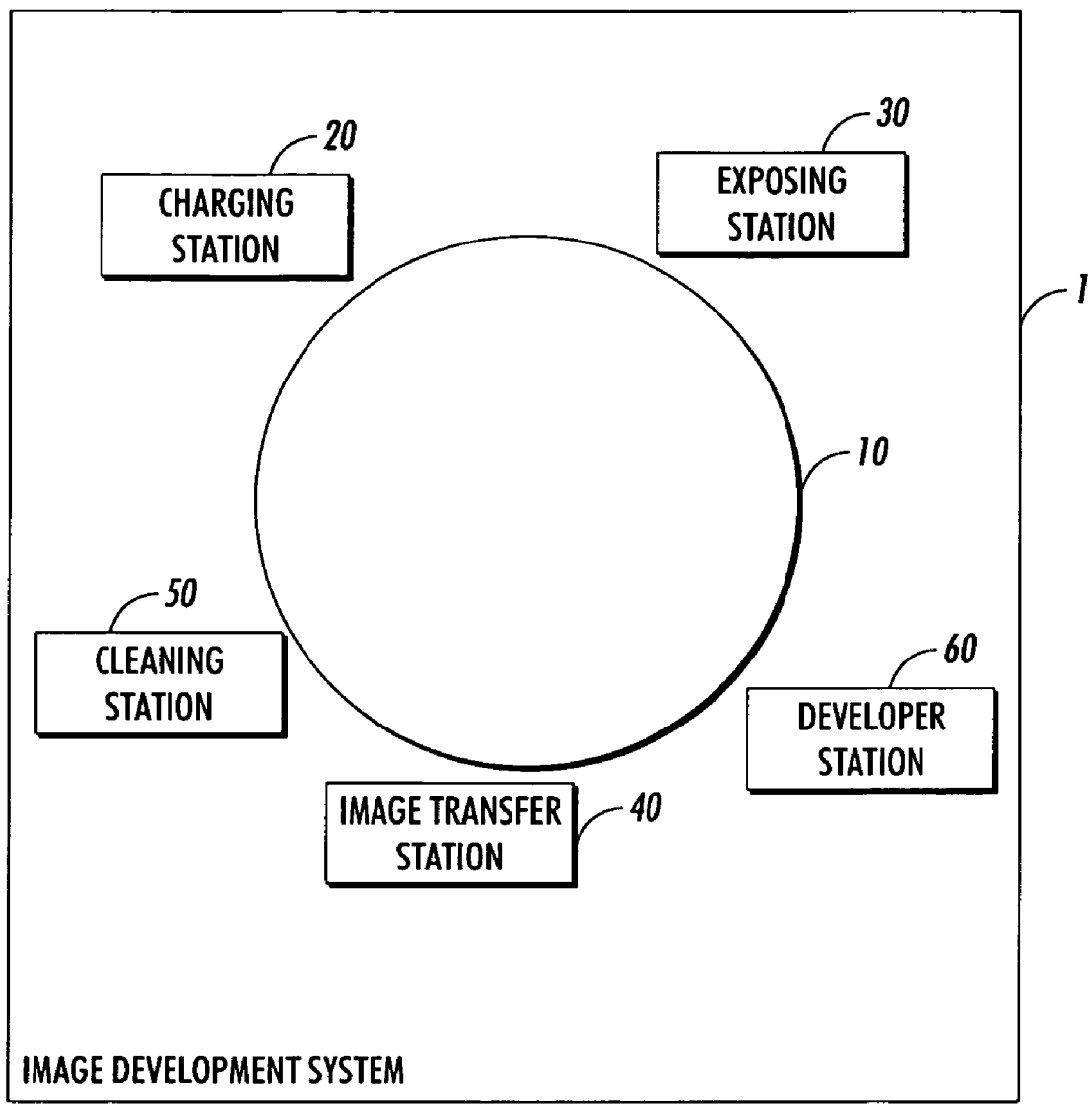
FIG. 1 shows one exemplary embodiment of an image development system of an electrophotographic printing machine that incorporates a magnetic roll formed by the various exemplary embodiments of the methods and systems according to this invention.

FIG. 1 illustrates one exemplary embodiment of an image development system 1 of an electrophotographic printing machine that incorporates a magnetic roll formed by the various exemplary embodiments of the systems and methods according to this invention. As shown in FIG. 1, the image development system 1 includes a photoreceptor drum 10, a charging station 20, an exposing station 30, an image transfer station 40, a cleaning station 50, and a developer station 60 arranged circumferentially around the photoreceptor drum 10. The photoreceptor drum 10 is substantially uniformly charged at the charging station 20. Exposing the charged photoreceptive drum 10 to a light image at the exposing station 30 discharges selective areas of the charged photoreceptive drum 10, creating an electrostatic latent image on the photoreceptor drum 10 corresponding to the original input document or signal. This latent image is subsequently developed into a developed, or visible, image by supplying liquid ink or powder toner to the latent image formed on the surface of the photoreceptor drum 10 as the photoreceptor drum 10 rotates past the developer station 60. The developed image is subsequently transferred from the photoreceptor drum 10 to an image receiving medium at the image transfer station 40, either directly or via an intermediate transfer device. Once the developed image is transferred to the image receiving medium, any remaining toner particles are removed from the photoreceptor drum 10 at the cleaning station 50.

Figure 2:
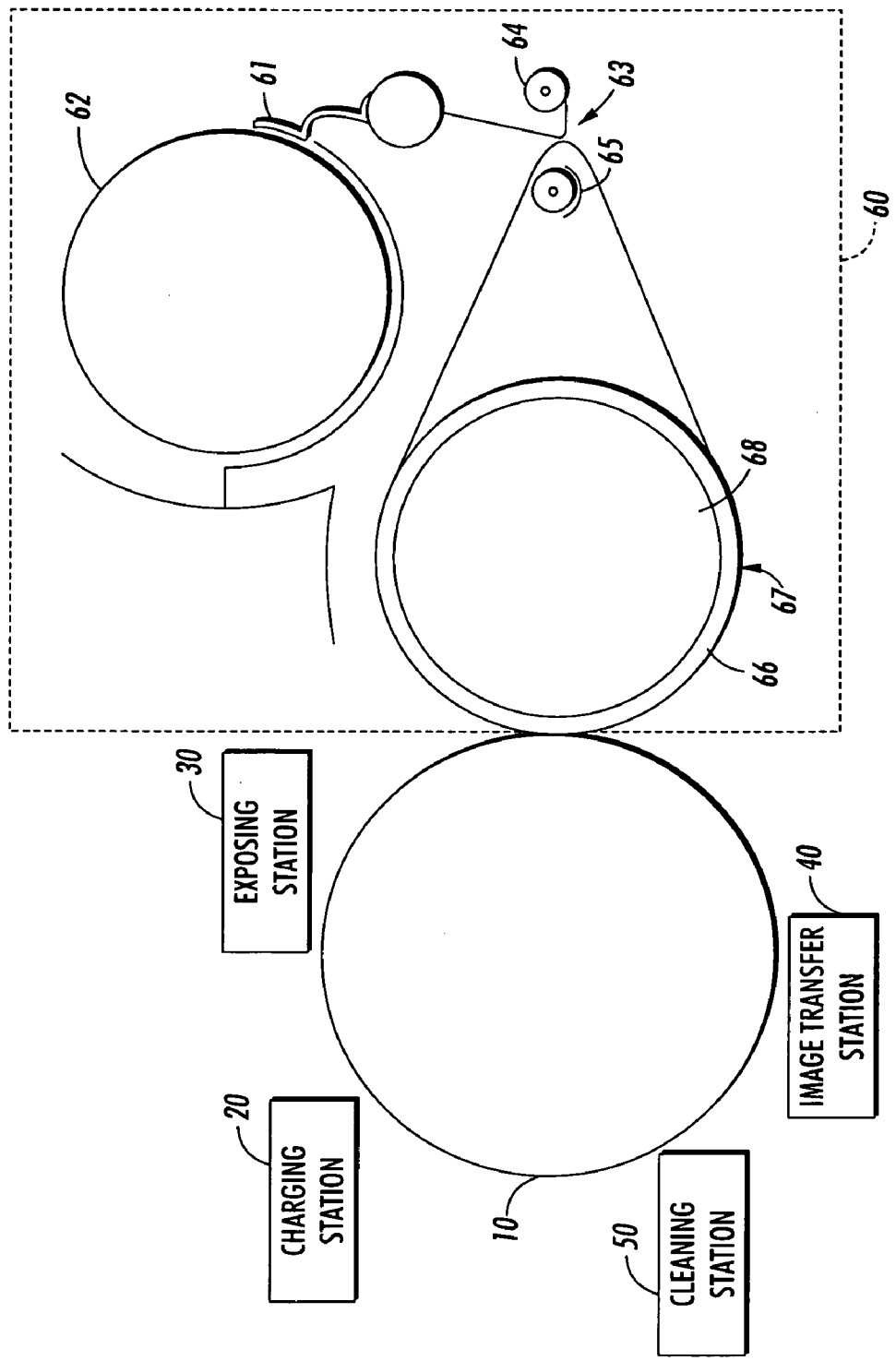
FIG. 2 shows one exemplary embodiment of a developer station.

FIG. 2 illustrates one exemplary embodiment of the developer station 60. As shown in FIG. 2, the developer station 60 includes a toner dispensing cartridge 62, a development housing 61, a mixing assembly 63, and a magnetic brush developer roll 66. The toner dispensing cartridge 62 is rotatably mounted in the development housing 61 to dispense toner particles downward into a sump area occupied by the mixing assembly 63. The mixing assembly 63 includes a pair of rotatably mounted augers 64 and 65. The magnetic brush developer roll 66 includes a cylindrical sleeve 67 and a magnetic roll 68. The magnetic roll 68 includes a fixed assembly of permanent magnets. The axis of the brush developer roll 66 is parallel to the axis of photoreceptor drum 10. Rotating the sleeve 67 around the magnetic roll 68 carries the developer on the sleeve 67 into a developing relationship with the photoconductive surface 12 of the photoreceptor drum 10 to develop a latent electrostatic image on the photoconductive surface 12.

Figure 3:
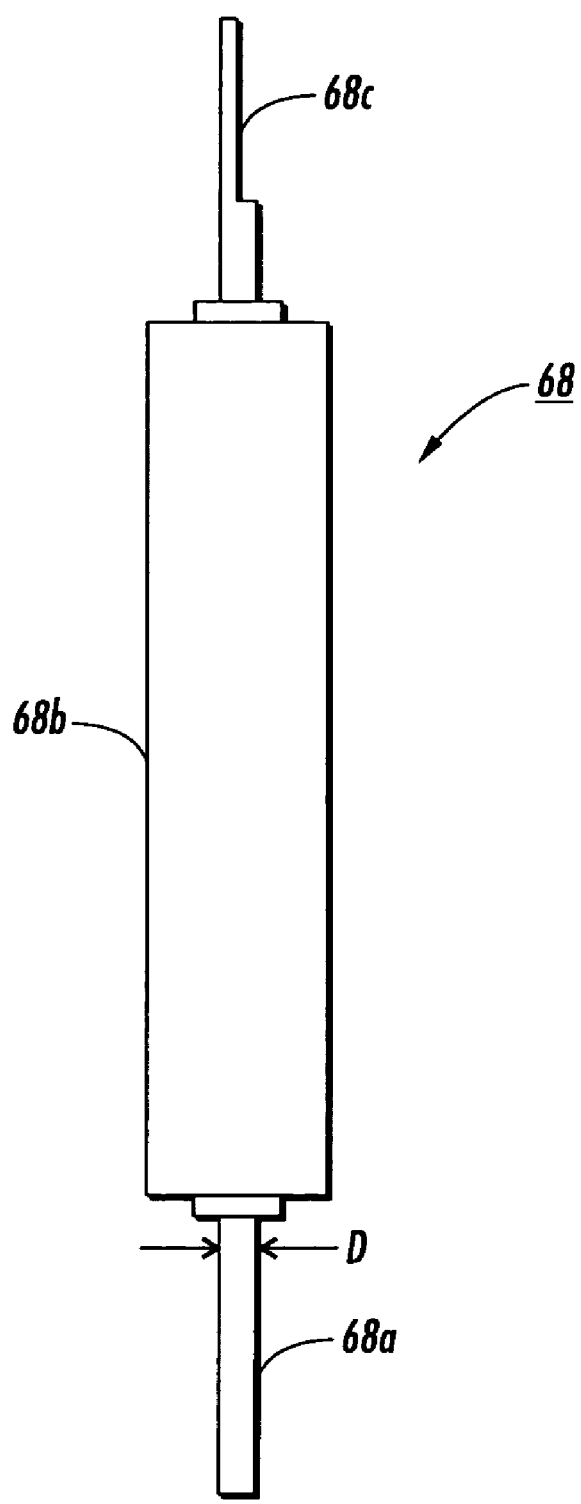
FIG. 3 shows one exemplary embodiment of a magnetic roll formed by the various embodiments of the methods and systems according to this invention.

FIG. 3 illustrates one exemplary embodiment of a magnetic roll 68 formed by the various embodiments of the methods and systems according to this invention. As shown in FIG. 3, the magnetic roll includes a core 68*b* positioned about a shaft 68*a*. The shaft has a notched or narrow portion 68*c*.

Figure 4:
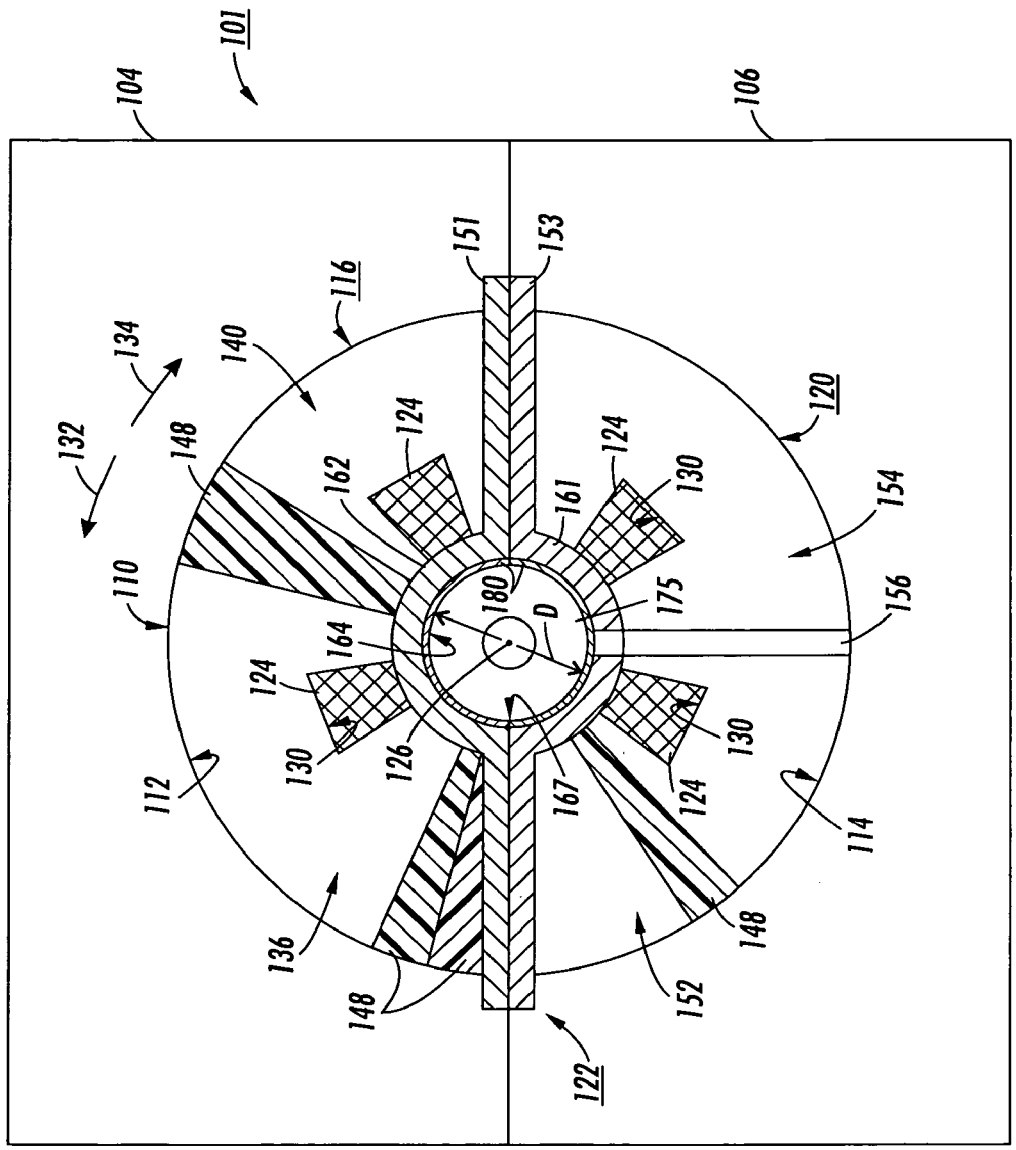
FIG. 4 shows one exemplary embodiment of a mold used to form a magnetic member using the systems and methods according to this invention.

FIG. 4 illustrates one exemplary embodiment of a mold 100 used to form the magnetic roll 68 using the systems and methods according to invention. As shown in FIG. 4, the mold 100 includes a mold support 101, a stationary mold 116, an ejector mold 120 and a mold insert 122.

The mold support 101 supports the mold 100. The mold support 101 includes a stationary mold support 104 and an ejector mold support 106. The stationary mold support 104 and the ejector mold support 106 may have any suitable shape for supporting the stationary mold 116 and the ejector mold 120. For example, the stationary mold support 104 and the ejector mold support 106 may combine to have a generally rectangular shape with a generally uniform cross-section, although neither are necessary. The stationary mold support 104 and the ejector mold support 106 combine to form an aperture 110. The stationary mold 116 and the ejector mold 120 matingly fit in the aperture 110. The aperture 110 may have any suitable shape. In various exemplary embodiments, when used to mold circular cross-section parts, such as the magnetic roll 68, the aperture 110 is formed from two generally semicircular voids 112 and 114 in the stationary mold support 104 and the ejector mold support 106, respectively. Of course, the aperture 110 can have any shape that is appropriate for forming a magnetic member having a specific shape.

The stationary mold 116 is supported by the stationary mold support 104, while the ejector mold 120 is supported by the ejector mold support 106. The stationary mold 116 and the ejector mold 120 are made of any suitable durable material, such as a metal alloy, such as, for example, copper and beryllium.

The mold 100 includes permanent magnet members 124. The permanent magnet members 124 provide a magnetic field usable to magnetize the material used to make the magnetic member. The permanent magnet members 124 may have any suitable shape. As shown in FIG. 4, in various exemplary embodiments, the permanent magnet members 124 have a generally rectangular cross-section and extend in a direction generally parallel to the centerline 126 of the mold 100. The permanent magnet members 124 may be made of any suitable durable material, such as "Samariam Cobalt", manufactured by Magnet Sales and Manufacturing. The permanent magnet members 124 are positioned in pockets 130 within the stationary mold 116 and the ejector mold 120. The pockets 130 generally conform to the shape of the magnetic members 124.

The stationary mold 116 includes a stationary mold first mold segment 136 and a stationary mold second mold segment 140. The stationary mold first mold segment 136 and the stationary mold second mold segment 140 are rotatably positionable about the mold centerline 126. Wedges 148 are positioned between the stationary mold first mold segment 136 and the stationary mold second mold segment 140. The stationary mold first mold segment 136 and the stationary mold second mold segment 140 are held in place by the wedges 148.

Similarly, the ejector mold 120 includes an ejector mold first mold segment 152 and an ejector mold second mold segment 154. The ejector mold first mold segment 152 and the ejector mold second mold segment 154 are rotatably positionable about the mold centerline 126. The wedges 148 are positioned between the ejector mold first mold segment 152 and the ejector mold second mold segment 154. The ejector mold first mold segment 152 and the ejector mold second mold segment 154 are held in place by the wedges 148. Thus, the permanent magnet members 124 are rotatably positionable in the direction of first arrow 132 and second arrow 134 to position the poles of the magnetic member at any desired position.

One or more ejector pins 156 are located within the ejector mold 120. The ejector pins 156 are provided to physically separate the magnetic member from the ejector mold 120.

An insert 122 is positioned between the stationary mold 116 and the ejector mold 120. The insert 122 accommodates the abrasive wear cause by the ferrite material used to mold the magnetic member. The insert 122 is replaceable, so that worn inserts can be replaced with new inserts. The insert 122 includes a stationary cover plate 151 that conforms to the stationary mold 116 and an ejector cover plate 153 that conforms to the ejector mold 120 opposite the stationary cover plate 151. The ejector cover plate 153 and the stationary cover plate 151 are made of a non-magnetic metal, such as beryllium-copper. In various exemplary embodiments, when forming a cylindrical magnetic member, such as the magnetic roll or roller 68, the ejector cover plate 153 has a semicircular portion 161, while the stationary cover plate 151 has a semicircular portion 162 arranged opposite the semicircular portion 161 of the ejector cover plate 153. Of course, the portions 161 and 162 of the ejector and stationary cover plates 153 and 151, respectively, can have any external shape that conforms to the surface of the void 110 and any internal shape that conforms to the desired shape for the magnetic member to be formed using the mold 100.

The stationary cover plate 151 and the ejector cover plate 153 are secured to the stationary mold support 104 and the ejector mold support 106, respectively, by any suitable method, such as by gluing, riveting, or fastening. The portion 161 and the portion 162 combine to form the inner periphery 164 of the mold cavity 175 of the mold 100. In various exemplary embodiments, when forming a cylindrical magnetic member, such as the magnetic roll or roller 68, the inner periphery 164 of the mold cavity 175 defines a diameter D that is roughly equal to the outside diameter of the magnetic roll 68.

A parting line 167 is formed where the ejector cover plate 153 and the stationary cover plate 151 diverge. The parting line 167 represents the critical wear portion of the insert 122. Wear on the insert 122 at the parting line 167 causes a protrusion to form on the periphery of the magnetic member 68, such as the magnetic roll or roller 68. This protrusion requires subsequent machining. Thus, insert 122 is replaced often to reduce the frequency and/or likelihood of forming the parting line protrusion on the magnetic member, such as the magnetic roll or roller 68. Frequent replacement of the insert 122 is costly.

Coating the insert 122 with a coating 180 according to this invention reduces the replacement frequency of the insert 122 and reduces the cost of injection molding magnetic members using the mold 100.

Figure 5:
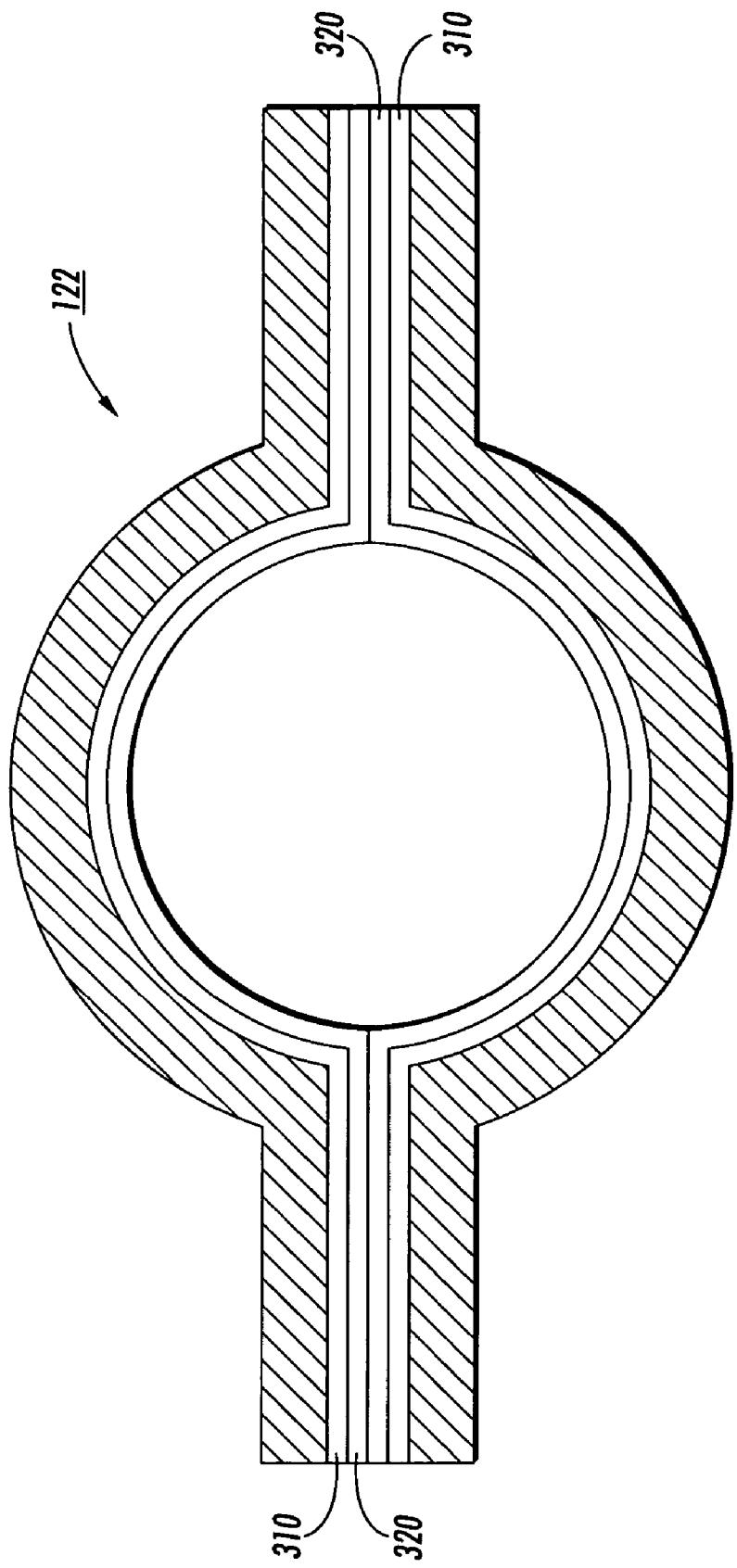
FIG. 5 shows an insert coated with one exemplary embodiment of a coating applied by the methods according to this invention.

FIG. 5 shows the insert 122 coated with one exemplary embodiment of a coating according to this invention. In various exemplary embodiments, the insert 122 is made of beryllium-copper, and the coating comprises a composite of electroless nickel (Ni) and chromium nitride (CrN). Although a beryllium-copper mold insert 122 will be discussed in the various exemplary embodiments of this invention, it should be appreciated that the mold inset 122 can be formed of almost any suitable alloy or base metal, or any other known or later-developed suitable material.

In various exemplary embodiments, an electroless nickel layer 310 is formed over the insert 122. Alternatively, electroless nickel can be applied directly to, for example, a beryllium-copper insert 122 to form the electroless nickel layer 310. In various exemplary embodiments, a chromium nitride layer 320 is formed over the electroless nickel layer 310. Alternatively, chromium nitride is applied on the electroless nickel layer 310 to form the chromium nitride layer 320 on the electroless nickel layer 310. The electroless nickel (Ni) layer 310 can be applied on or over the insert 122 by any suitable means, such as an electroless nickel plating process. The chromium nitride layer 320 can thereafter be applied on or over the electroless nickel layer 310 by any suitable process, such as a flame spray process. In various exemplary embodiments, the chromium nitride layer 320 is permeable, but provides excellent protection from abrasive wear caused by the molding material used to form the magnetic member. The electroless nickel layer 310 under the chromium nitride layer 320 provides an excellent chemical shield for the insert 122.

The chromium nitride layer 320 can also be applied on or over the electroless nickel layer 310 using physical vapor deposition. Physical vapor deposition requires the use of a physical vapor deposition chromium nitride. PVD is a low temperature process. In general, it is important to keep the beryllium-copper used in a beryllium copper insert 122 away from heat, because the beryllium-copper will anneal and lose hardness when exposed to heat.

In various exemplary embodiments, the electroless nickel layer 310 can have a thickness of at least about 5 microns. In some of these embodiments, the electroless nickel layer 310 can have a thickness that is at least about 10 microns. In some of those embodiments, the electroless nickel layer 310 can have a thickness that is at least about 15 microns. In various other exemplary embodiments, the electroless nickel layer 310 can have a thickness that is at most about 75 microns. In some of these embodiments, the electroless nickel layer 310 can have a thickness that is at most about 50 microns. In some of those embodiments, the electroless nickel layer 310 can have a thickness that is at most about 35 microns. The inventors have discovered that an electroless nickel layer 310 having a thickness of about 25 microns can give superior results.

In various exemplary embodiments, the chromium nitride layer 320 has a thickness of at least about 0.5 microns. The inventors have determined that the ability of the chromium nitride layer to increase the useful lifetime of the insert 122 generally improves with increasing thickness of the chromium nitride layer 320. However, current limitations on the physical vapor deposition process used to form the chromium nitride layer 320 limit potential thickness of the chromium nitride layer 320 to about 1 micron. This current limit is due in large part to stress build-up in the PVD formed chromium nitride layer. Thus, this invention contemplates using a chromium nitride layer 370 having thicknesses greater than 1 micron. Thus, in some of these embodiments, the chromium nitride layer 320 has a thickness of at least about 0.75 micron. In some of those embodiments, the chromium nitride layer has a thickness of at least about 1 micron. The inventors have discovered that a chromium nitride layer of about 1 micron in thickness, given current process limits, can give superior results.

As described above, the coating layers 310 and 320 applied to the Be—Cu insert increase the useful life of the Be—Cu mold inserts. Thus, for example, whereas conventional Be—Cu mold inserts have an average acceptable service life of about 25,000 uses, the mold inserts coated according to this invention have an average acceptable service life of at least about 30,000 uses, and often have an average acceptable service life of at least about 50,000 uses. In various exemplary embodiments, the coatings according to this invention can provide mold inserts having an average acceptable service life of about 100,000 uses or more.

As shown in FIG. 4, when forming a magnetic roll 68 as shown in FIG. 3, the shaft 68a of the magnetic roll 68 is positioned in the mold cavity 175. A number of supports are provided at the opposed ends of the mold 100. The supports support the shaft 68a in the mold cavity 175. The shaft 68a is made of any suitable durable material capable of supporting the core 68b, such as a non-magnetic metal. The shaft 68a has any suitable shape. If the shaft 68a is used to form the magnetic roll 68, the shaft is a cylindrical shape having a diameter D of sufficient size to support the core 68b as shown in FIG. 3. The narrowed portion 68c mates with a mating portion (not shown) on the mold 100. The narrowed portion 68c of the shaft 68a provides an absolute magnetic pole location for the core 68b with respect to the shaft 68a in the mold 100 and provides an absolute magnetic pole location for the core 68b with respect to the shaft 68a when assembled into the developer station 60.

The core 68b of the magnetic roll 68 is molded around the shaft 68a by filling the mold cavity 175 with any suitable moldable material, such as polyester, nylon, urethane, or an epoxy. The core material may be fortified with fillers, such as milled glass, glass fibers, conductive fillers, or reinforcements. The core material typically includes a magnetizable ferrite material. The permanent magnets 124 positioned around the mold cavity 175 orient and magnetize the core 68b to a desired magnetic saturation level. The core 68b is then allowed to cool until it solidifies around the shaft 280 to form the magnetic roll 68. The magnetic roll 68 is then removed from the mold 100.

The following examples are illustrative of embodiments of this invention, but do not limit this invention. It will be apparent, however, that the structures, compositions and method of this invention can be practiced with many different types and amounts of materials and can be used for a variety of different uses in accordance with the disclosure outlined above and as pointed out below.

EXAMPLES

Comparative Example 1

A conventional Be—Cu mold insert, without any surface coatings, is used in a molding apparatus and process for producing magnetic rolls. The mold insert is examined periodically to determine if replacement is necessary. Examination shows that the mold insert requires replacement after about 25,000 uses.

Example 1

Similar to Comparative Example 1, a conventional Be—Cu mold insert is used in a molding apparatus and process for producing magnetic rolls. However, the conventional Be—Cu mold insert is first coated with a layer of electroless nickel, having a thickness of 75 microns using electroless plating, followed by a layer of chromium nitride having a thickness of less than about 1 micron, applied by flame spraying. The mold insert is examined periodically to determine if replacement is necessary. Examination shows that the mold insert does not require replacement, even after 30,000 uses.

Comparative Examples 2–6

Similar to Comparative Example 1, conventional Be—Cu mold inserts are used in a molding apparatus and process for producing magnetic rolls. However, the conventional Be—Cu mold inserts are first coated with one or more layers of protective material. The thickness of each coating, except for the diamond black coating, is about 25 microns. The diamond black coating is a PVD coating which is proprietary to Diamond Black Inc. The diamond black coating is limited to 1 micron thickness and is probably about 0.75 microns in this application. TiN titanium, nitride can be deposited using physical vapor deposition (PVD) or chemical vapor deposition (CVD). Chemical vapor deposition does not require that the thickness be limited to one micron. The particular layer structure is shown in Table 1. The mold insert is examined periodically to determine if replacement is necessary. The examination results are also shown in Table 1.

TABLE 1

| Example | Bottom Coating | Top Coating (if any) | Results |
|---------|----------------|----------------------|---------|
| Comp 2  | diamond black  | none                 | Showed poor adhesion to substrate, failed after 3,000 uses |
| Comp 3  | CrN            | diamond black        | Noticeable wear at 15,000 uses |

TABLE 1-continued

| Example | Bottom Coating | Top Coating (if any) | Results |
|---------|----------------|----------------------|---------|
| Comp 4  | TiN            | none                 | Failed  |
| Comp 5  | CrN            | none                 | Failed  |
| Comp 6  | Armalloy ™     | none                 | Failed  |

While this invention has been described in conjunction with the various exemplary embodiments as outlined above, it is evident that many alternatives, modifications and variations will be apparent to those skilled in the art. Accordingly, the various exemplary embodiments of the invention set forth above are intended to be illustrative, not limiting. Various changes may be made without departing from the spirit and scope of the invention.

What is claimed is:

1. A coated mold insert, comprising:
   a mold insert;
   an electroless nickel layer formed over at least one surface of the mold insert; and
   a layer of chromium nitride formed over the electroless nickel layer;
   wherein the mold insert comprises a through opening that extends from one end of the mold insert to an opposite end of the mold insert.

2. The coated mold insert of claim 1, wherein the electroless nickel layer is formed on the mold insert.

3. The coated mold insert of claim 1, wherein the chromium nitride layer is formed on the electroless nickel layer.

4. The coated mold insert of claim 1, wherein the electroless nickel layer is formed on the mold insert, and the chromium nitride layer is formed on the electroless nickel layer.

5. The coated mold insert of claim 1, wherein the electroless nickel layer has a thickness of at least about 5 microns.

6. The coated mold insert of claim 5, wherein the electroless nickel layer has a thickness of at least about 15 microns.

7. The coated mold insert of claim 6, wherein the electroless nickel layer has a thickness of at least about 25 microns.

8. The coated mold insert of claim 7, wherein the electroless nickel layer has a thickness of about 35 microns.

9. The coated mold insert of claim 1, wherein the electroless nickel layer has a thickness of at most about 75 microns.

10. The coated mold insert of claim 9, wherein the electroless nickel layer has a thickness of at most about 50 microns.

11. The coated mold insert of claim 1, wherein the chromium nitride layer has a thickness of at least about .50 micron.

12. The coated mold insert of claim 11, wherein the chromium nitride layer has a thickness of at least about .75 micron.

13. The coated mold insert of claim 12, wherein the chromium nitride layer has a thickness of at least about 1 micron.

14. The coated mold insert of claim 1, wherein the mold insert is insertable into a mold used to form a magnetic member from mold material.

15. The coated mold insert of claim 1, wherein the mold insert comprises:
  a first mold insert portion having a first surface; and
  a second mold insert portion having a first surface that faces the first surface of the first mold insert portion;
  wherein the electroless nickel layer is formed on or over the first surfaces of the first and second mold insert portions.

16. A mold body, comprising:
  a first mold portion having a surface;
  a second mold portion disposed adjacent the first mold portion and having a surface opposite the surface of the first mold portion;
  an opening extending through the mold body and defined by a portion of the surface of the first mold portion and a portion of the second mold portion; and
  the coated mold insert of claim 1.

17. The mold body of claim 16, wherein the mold further comprises a mold support having a first mold support portion that supports the first mold portion and a second mold support portion that supports the second mold portion.

18. The coated mold insert of claim 1, wherein the mold insert is a Be-Cu mold insert.

* * * * *